S. B. MINNICH.

Tobacco-Press.

No. 7,945. Reissued Nov. 13, 1877.

*Witnesses.*

W. B. Wiley

Jacob Stauffer

*Inventor.*

Simon B. Minnich

N. PETERS, PHOTO-LITHOGRAPHER, WASHINGTON, D. C.

UNITED STATES PATENT OFFICE.

SIMON B. MINNICH, OF LANDISVILLE, PENNSYLVANIA.

IMPROVEMENT IN TOBACCO-PRESSES.

Specification forming part of Letters Patent No. 173,736, dated February 22, 1876; Reissue No. 7,945, dated November 13, 1877; application filed March 16, 1877.

*To all whom it may concern:*

Be it known that I, SIMON B. MINNICH, of Landisville, in the county of Lancaster and State of Pennsylvania, have invented certain Improvements in Tobacco-Presses, of which the following is a specification:

The object of my invention is to provide a portable tobacco-press that can be adjusted for longer or shorter bales, with the sides so hinged as to be readily removed or laid down out of the way for cording, together with a multifaced or round press-beam at the ends, at least, so as to rotate in its chain-connection by means of a lever attachment, in order to secure a vertical adjustment of the pressure without relaxing the chain, as also the construction of a detachable lever to operate the ratchet and pawl on the windlass.

The accompanying drawings, with the letters of reference marked thereon, together with a brief description, will enable those skilled in the art to make and use the same.

Figure 1:
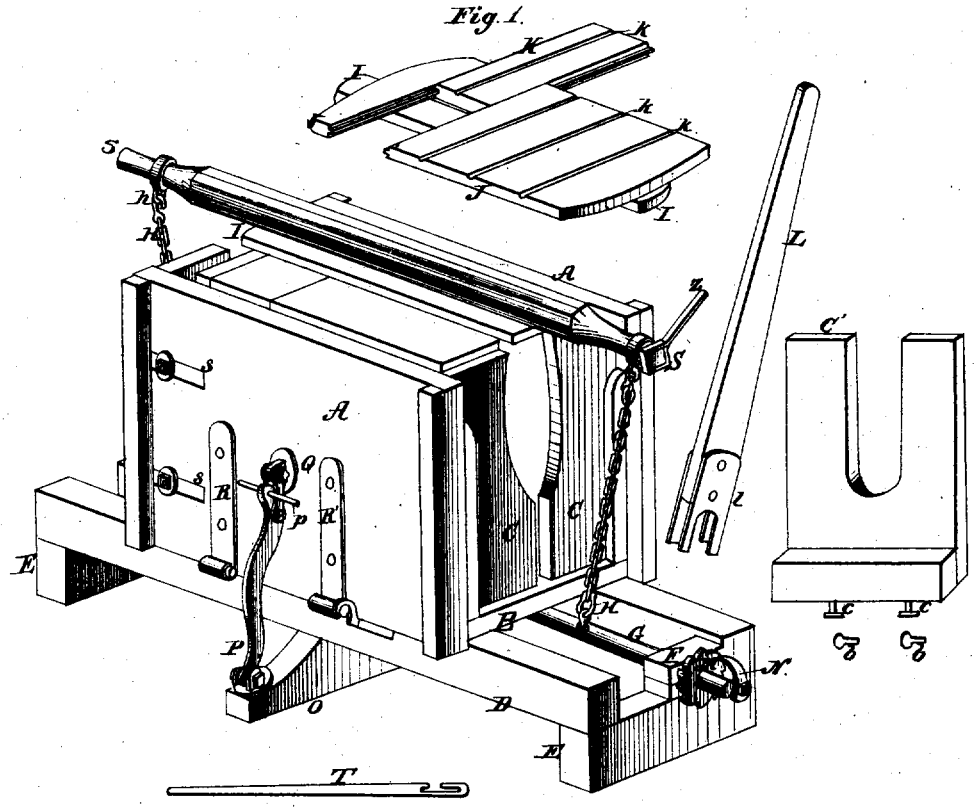
Figure 2:
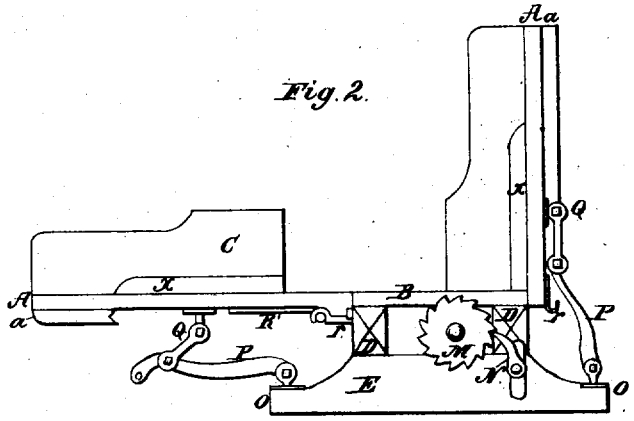

Figure 1 is a perspective view of the press with all its parts in place. Fig. 2 is an elevation or end view, showing one side of the box with the half end portion attached laid down; the other, in its vertical position, braced and locked. Portions detached are separately illustrated and lettered.

The press-box is formed by connecting the one half of the end pieces C with the sides A, to which they may be firmly secured at one end, or made adjustable at both ends by means of slots *s* and binding-screws and washers, so as to shorten or lengthen the space within the combined box for receiving fillers or other shorter or longer material to be baled. These sides A are hinged to the side rails D, or base of the machine, which supports the fixed bottom B, so that the sides can be laid down flat out of the way, with their respective portions of the end pieces C firmly attached thereto, or made adjustable, as aforesaid.

The bottom B, as also the under side of the follower J, have the ordinary grooves, through which the baling-cords are passed with ease by means of an open-eyed implement, (shown at T.)

I also show an end piece, C′, having headed pins *c*, or their equivalent, in the base-rail beneath, for being inserted through eyed slots *b*, made in the bottom B of the box; but it may be preferable to make the ends adjustable on the sides.

My follower J also shows a sliding piece, K, which can be removed. If desirable, several such can be made at one or both ends, to adapt it to the capacity of the adjusted box.

The end pieces C are shown cut out, so that the projecting ends of the follower or beam may not be obstructed in the pressing process. In order to brace the side pieces A in their vertical position without loss of time, I use the jointed lock-brace P Q, hinged at one end to the box, and the other to a central cross-piece, O, projecting on each side, as shown. The hinge R′ has a turn-hook to secure the hinge, and which, by turning upward, allows the hinge-bands to be withdrawn and the sides removed by first drawing the pivot-bolt to disconnect the jointed brace-piece P from the foot-piece on O, should it be desirable to detach the box altogether.

For a press-box of uniform size, the end pieces C may be permanently fixed to the sides A in sections, as shown, in which case the jointed side brace P Q may be modified, or simple hook-latches fixed on each portion of the end pieces, so as to interlock firmly, and hold the box together on the ends.

I find a small lever or tripper attachment combined with the hook-latches facilitates the unlatching them.

To enable me to shift my press-beam while under pressure, without relaxing the chain or connection, and restore and secure a regular vertical pressure, I use a multifaced pressure-beam, S, having narrow flat sides resting upon the follower, and the ends rounded, so as to turn in a hook ring or collar, *h*, in connection with the chain H and an ordinary windlass, G, provided with its ratchet and pawl M N.

To rotate the press-beam from one face to the other under pressure, to secure the proper adjustment, (it would, in fact, be the same on a round beam,) I attach a lever, Z, to one or both ends of the beam, or at any point or manner, for the purpose of turning the pressing-beam with perfect ease without relaxing the chain under pressure.

I find it of great advantage to employ a detached lever, L, provided with a pair of stout side plates at the end, centrally made concave to set over the shaft, while the ratchet-wheel is received between the plates, and a cross pin or bolt to engage the ratchet-teeth for turning the shaft of the windlass in winding the chain while pressing.

I am aware that multi-angular press-beams, in combination with a chain and windlass, have been used in baling tobacco. The great tendency of the mass under pressure to yield more or less to one side or the other causes delay and the necessity to relax the chain, in order to get the beam adjusted to a true vertical pressure.

I am not aware that a rotating press-beam provided with a lever was ever known or used before I invented the same, so that any desired adjustment in the pressure-beam on the follower can be readily made without relaxing the chain, or loss of time. Nor am I aware that a detachable lever, for operating the ratchet-wheel on the windlass of a tobacco-press, practically of the greatest utility, was ever before used, constructed substantially as herein set forth. Therefore,

What I claim as my improvement in baling-presses is—

1. In combination with the hinged sides A and sections C to form the ends, the hinged lock-brace P Q, for uniting or retaining the parts under pressure, substantially as and for the purpose specified.

2. In combination with the removable hinged sides A, provided with slots *s*, the adjustable end pieces C, as and for the purpose mentioned.

3. The rotary press-beam S, in combination with the lever Z, for rotating the same, in order to adjust the pressure without relaxing the chain, substantially as herein set forth.

4. In a bifurcated lever, L, the simple central pin or bolt, for operating the teeth of the ratchet, and so that either of the double sides of the lever may be turned up and used, the whole constructed and operating as herein specified.

SIMON B. MINNICH.

Witnesses:
W. B. WILEY,
JACOB STAUFFER.